(12) United States Patent
Grigoriev et al.

(10) Patent No.: US 8,753,478 B2
(45) Date of Patent: Jun. 17, 2014

(54) CREPING ADHESIVES COMPRISING BLENDS OF HIGH AND LOW MOLECULAR WEIGHT RESINS

(75) Inventors: Vladimir A. Grigoriev, Chicago, IL (US); Gary S. Furman, St. Charles, IL (US)

(73) Assignee: Nalco Company, Naperville, IL (US)

( * ) Notice: Subject to any disclaimer, the term of this patent is extended or adjusted under 35 U.S.C. 154(b) by 811 days.

(21) Appl. No.: 11/946,397

(22) Filed: Nov. 28, 2007

(65) Prior Publication Data

US 2009/0133846 A1 May 28, 2009

Related U.S. Application Data

(63) Continuation-in-part of application No. 11/321,995, filed on Dec. 29, 2005, now Pat. No. 8,066,847.

(51) Int. Cl.
| | |
|---|---|
| *B31F 1/12* | (2006.01) |
| *D21H 21/14* | (2006.01) |
| *D21H 17/36* | (2006.01) |
| *D21H 17/56* | (2006.01) |
| *C09J 129/04* | (2006.01) |
| *C09J 179/02* | (2006.01) |
| *C08L 79/02* | (2006.01) |

(52) U.S. Cl.
CPC ............. *D21H 21/146* (2013.01); *D21H 17/56* (2013.01); *D21H 17/36* (2013.01); *B32F 1/14* (2013.01); *C09J 129/04* (2013.01); *C09J 179/02* (2013.01); *C08L 79/02* (2013.01)
USPC ...................... 162/112; 162/168.3; 162/164.3

(58) Field of Classification Search
CPC ..... D21H 21/146; D21H 17/56; D21H 17/36; B31F 1/12; B31F 1/14; C08L 79/02
USPC ........ 162/111–112, 158, 164.1, 164.3, 164.6, 162/168.1–168.3, 179; 525/420, 430; 528/271, 310, 332, 480; 524/599, 524/606–608, 612, 127
See application file for complete search history.

(56) References Cited

U.S. PATENT DOCUMENTS

| | | | | |
|---|---|---|---|---|
| 3,125,552 A | * | 3/1964 | Loshaek et al. ................ | 525/421 |
| 3,332,901 A | * | 7/1967 | Keim ............................ | 524/608 |
| 3,887,510 A | * | 6/1975 | Chan et al. .................... | 524/602 |
| 3,932,363 A | * | 1/1976 | Lehmann et al. ............. | 525/421 |
| 3,951,921 A | * | 4/1976 | Espy et al. .................... | 525/430 |
| 4,166,002 A | * | 8/1979 | Lehmann et al. ........... | 162/164.5 |
| 4,341,670 A | * | 7/1982 | Hinze et al. ................... | 528/338 |
| 4,501,862 A | * | 2/1985 | Keim ............................ | 525/430 |
| 4,537,657 A | * | 8/1985 | Keim ......................... | 162/164.3 |
| 4,684,439 A | * | 8/1987 | Soerens ........................ | 162/111 |
| 4,755,298 A | * | 7/1988 | Grinstead ..................... | 210/638 |
| 4,788,243 A | * | 11/1988 | Soerens ........................ | 524/503 |
| 4,994,146 A | * | 2/1991 | Soerens ........................ | 162/112 |
| 5,025,046 A | * | 6/1991 | Soerens ........................ | 524/72 |
| 5,179,150 A | | 1/1993 | Furman, Jr. et al. | |
| 5,316,623 A | * | 5/1994 | Espy ......................... | 162/164.3 |
| 5,382,323 A | | 1/1995 | Furman, Jr. et al. | |
| 5,399,241 A | * | 3/1995 | Oriaran et al. ................ | 162/112 |
| 5,525,664 A | * | 6/1996 | Miller et al. .................. | 524/845 |
| 6,133,405 A | * | 10/2000 | Allen ............................ | 528/310 |
| 6,277,242 B1 | | 8/2001 | Archer et al. | |
| 6,379,496 B2 | * | 4/2002 | Edwards et al. .............. | 162/111 |
| 6,547,925 B1 | * | 4/2003 | Drew et al. ................... | 162/111 |
| 6,835,264 B2 | * | 12/2004 | Sayovitz et al. .............. | 156/183 |
| 8,066,847 B2 | * | 11/2011 | Grigoriev et al. ............. | 162/111 |
| 2003/0114631 A1 | * | 6/2003 | Walton et al. ................. | 528/106 |
| 2004/0177940 A1 | * | 9/2004 | Archer et al. ................. | 162/199 |
| 2005/0006040 A1 | * | 1/2005 | Boettcher et al. ............. | 162/111 |
| 2005/0006042 A1 | * | 1/2005 | Riehle et al. ............... | 162/164.3 |
| 2005/0161181 A1 | | 7/2005 | St. John et al. | |
| 2005/0279471 A1 | * | 12/2005 | Murray et al. ................ | 162/111 |
| 2007/0000631 A1 | * | 1/2007 | Grigoriev et al. ............. | 162/111 |
| 2007/0151684 A1 | * | 7/2007 | Grigoriev et al. ............. | 162/111 |
| 2007/0208115 A1 | * | 9/2007 | Grigoriev et al. ............. | 524/127 |
| 2009/0133846 A1 | * | 5/2009 | Grigoriev et al. ............. | 162/112 |
| 2010/0122785 A1 | * | 5/2010 | Grigoriev et al. ............. | 162/111 |
| 2011/0218271 A1 | * | 9/2011 | Boettcher et al. ............. | 523/402 |
| 2012/0247697 A1 | * | 10/2012 | Lu et al. ........................ | 162/111 |

FOREIGN PATENT DOCUMENTS

| | | | | |
|---|---|---|---|---|
| WO | WO 9902486 A1 | * | 1/1999 | ........... C07C 233/18 |
| WO | WO 2007079064 A2 | * | 7/2007 | |
| WO | WO 2009070647 A1 | * | 6/2009 | |

\* cited by examiner

*Primary Examiner* — Jose Fortuna
(74) *Attorney, Agent, or Firm* — Benjamin E. Carlsen

(57) ABSTRACT

A composition comprising one or more high molecular weight resins and one or more low molecular weight resins in a ratio of about 1:99 to about 99:1 based on polymer actives, wherein said high molecular weight resins are selected from the group consisting of glyoxylated polyacrylamide, crosslinked polyaminoamide and polyaminoamide-epihalohydrin resins having a molecular weight of about 100,000 to about 5,000,000 Dalton and the low molecular weight resins are selected from the group consisting of glyoxylated polyacrylamide, crosslinked polyaminoamide and polyaminoamide-epihalohydrin resins having a molecular weight of less than about 100,000 Dalton and wherein the mole ratio of epihalohydrin to secondary nitrogen atoms in the high and low molecular weight polyaminoamide-epihalohydrin resins is less than about 0.5. and use of the composition for creping paper webs.

8 Claims, No Drawings

CREPING ADHESIVES COMPRISING BLENDS OF HIGH AND LOW MOLECULAR WEIGHT RESINS

CROSS-REFERENCE TO RELATED APPLICATIONS

This application is a continuation in part of U.S. patent application Ser. No. 11/321,995 filed on Dec. 29, 2005 which has issued as U.S. Pat. No. 8,066,847 on Nov. 29, 2011.

TECHNICAL FIELD

This invention relates to a method of creping paper products in which a paper web is adhered to a creping cylinder using an adhesive composition comprising a blend of high and low molecular weight glyoxylated polyacrylamide, crosslinked polyaminoamide or polyaminoamide-epihalohydrin resins, or mixtures thereof.

BACKGROUND OF THE INVENTION

The desired properties of tissue, including softness, bulk, stretch and absorbency, are achieved by the means of a steam-heated Yankee dryer cylinder and a doctor blade. The wet fiber web is largely dewatered at the pressure roll nip where the sheet is transferred to the Yankee surface. At this point the paper web has 35-40% consistency. The sheet is further dried on the hot Yankee cylinder to 90-97% consistency and removed with a doctor blade. The mechanical action of the blade results in a disruption of the fiber-fiber bonds and a formation of a microfold structure within the sheet. This process is referred to as creping.

In order to develop the crepe, the paper web has to adhere to the surface of the Yankee dryer. The adhesion is predominantly provided by spraying an adhesive on the dryer, although contributions to adhesion from wet-end furnish components can also occur. Most common Yankee adhesives are synthetic polymers such as polyaminoamide-epichlorohydrin resins, polyamine-epichlorohydrin resins, polyvinyl alcohols, polyvinyl acetates, polyacrylamides, polyamines, polyamides, polyvinylpyrrolidones and polyethers. Other natural and derivatized natural polymers may also be employed including starch, guar gum, carboxymethyl cellulose, hydroxyethyl cellulose, hydroxypropyl cellulose and the like. Various low molecular weight compounds, oils and surfactants, are used to modify the Yankee coating properties.

A creping adhesive comprising a mixture of polyaminoamide epihalohydrin resins where the first resin has a mole ratio of epihalohydrin to secondary amino groups of the polyamine ranging from about 0.5:1 to about 1.8:1 and the second resin has a mole ratio of epihalohydrin to secondary amino groups of the polyamine of less than 0.5:1 is described in U.S. Pat. No. 6,277,242.

The tissue industry is interested in manufacturing very soft tissue (premium grades) that requires creping at very low sheet moisture levels (<3%). The conventional creping adhesives tend to become hard and less rewettable upon the extensive drying that is required for low moisture creping. The hard coating results in blade chatter and loss of adhesion, which can result in blade wear and non-uniform creping. Thus, there is a great demand for a creping adhesive that remains soft and rewettable under low moisture creping conditions.

Traditional thermosetting adhesives, that can be very similar to permanent wet strength resins, form very brittle coatings and work better at high moisture (>6%) creping conditions. Some thermosetting adhesives with lower levels of cross-linking are much more universal and can be used for creping over a wider range of sheet moisture, 3-7%. Non-thermosetting resins are generally easier to manage and provide better sheet control when creping at lower moisture levels. Modifiers, e.g. polyols such as glycerol, can further be used to adjust the level of adhesion and to improve softness and rewettability of the coating. However, even with the addition of modifiers, conventional adhesives become too hard and their use is still limited to moisture levels of >3%. Accordingly, there is an ongoing need for improved creping adhesive compositions.

SUMMARY OF THE INVENTION

In an embodiment, this invention is a composition comprising one or more high molecular weight resins and one or more low molecular weight resins in a ratio of about 1:99 to about 99:1 based on polymer actives, wherein said high molecular weight resins are selected from the group consisting of glyoxylated polyacrylamide, crosslinked polyaminoamide and polyaminoamide-epihalohydrin resins having a molecular weight of about 100,000 to about 5,000,000 Dalton and the low molecular weight resins are selected from the group consisting of glyoxylated polyacrylamide, crosslinked polyaminoamide and polyaminoamide-epihalohydrin resins having a molecular weight of less than about 100,000 Dalton and wherein the mole ratio of epihalohydrin to secondary nitrogen atoms in the high and low molecular weight polyaminoamide-epihalohydrin resins is less than about 0.5.

In another embodiment, this invention is a method of creping a paper web comprising a) applying to a rotating creping cylinder an adhesive composition comprising one or more high molecular weight resins and one or more low molecular weight resins in a ratio of about 1:99 to about 99:1 based on polymer actives, wherein said high molecular weight resins are selected from the group consisting of glyoxylated polyacrylamide, crosslinked polyaminoamide and polyaminoamide-epihalohydrin resins having a molecular weight of about 100,000 to about 5,000,000 Dalton and the low molecular weight resins are selected from the group consisting of glyoxylated polyacrylamide, crosslinked polyaminoamide and polyaminoamide-epihalohydrin resins having a molecular weight of less than about 100,000 Dalton and wherein the mole ratio of epihalohydrin to secondary nitrogen atoms in the high and low molecular weight polyaminoamide-epihalohydrin resins is less than about 0.5; b) pressing the paper web against the creping cylinder to effect adhesion of the paper web to the creping cylinder; and c) dislodging the paper web from the creping cylinder with a doctor blade.

In another embodiment, this invention is an aqueous creping composition comprising 50 to about 99.99 weight percent water and about 50 to about 0.01 weight percent of a composition comprising one or more high molecular weight resins and one or more low molecular weight resins in a ratio of about 1:99 to about 99:1 based on polymer actives, wherein said high molecular weight resins are selected from the group consisting of glyoxylated polyacrylamide, crosslinked polyaminoamide and polyaminoamide-epihalohydrin resins having a molecular weight of about 100,000 to about 5,000,000 Dalton and the low molecular weight resins are selected from the group consisting of glyoxylated polyacrylamide, crosslinked polyaminoamide and polyaminoamide-epihalohydrin resins having a molecular weight of less than about 100,000 Dalton and wherein the mole ratio of epihalohydrin to secondary nitrogen atoms in the high and low molecular weight polyaminoamide-epihalohydrin resins is less than about 0.5.

DETAILED DESCRIPTION OF THE INVENTION

This invention comprises a mixture of high and low molecular weight resins in a ratio of about 1:99 to about 99:1 where the high and low molecular weight resins are both selected from glyoxylated polyacrylamide, crosslinked polyaminoamide and polyaminoamide-epihalohydrin resins, the high molecular weight resin components having a molecular weight of about 100,000 to about 5,000,000 Dalton and the low molecular weight resin components having a molecular weight of less than about 100,000 Dalton.

In an embodiment, the high molecular weight resin has a molecular weight of about 300,000 Dalton to about 800,000 Dalton and the low molecular weight resin has a molecular weight of about 20,000 to about 50,000 Dalton.

In an embodiment, the composition comprises high and low molecular weight resins in a ratio of about 10:90 to about 90:10 based on polymer actives.

In an embodiment, the composition comprises high and low molecular weight resins in a ratio of about 25:75 to about 75:25 based on polymer actives.

Polyaminoamide-epihalohydrin resins useful in the composition of this invention are water soluble, cationic thermosetting resins typically prepared by reacting one or more polyalkylene polyamines containing secondary amine groups and one or more dicarboxylic acid derivatives to form a polyaminoamide and then reacting the polyaminoamide with epihalohydrin to form the polyaminoamide-epihalohydrin resin. The preparation of polyaminoamide-epihalohydrin resins is described, for example, in U.S. Pat. No. 6,277,242 and U.S. Published Patent Applications 2005/0217817 and 2007/0151684.

The polyamides can be made from the condensation polymerization of one or more organic dicarboxylic acid derivatives and one or more polyalkylene polyamines under conditions suitable for forming long-chain polyamides, for example at temperatures higher than about 130° C. for several hours with removal of water or alcohol byproducts. The resulting polyamide typically has weight average molecular weight of about 500 to about 500,000 Daltons as determined by gel permeation chromatography/multi-angle light scattering (GPC/MALLS) and a polymer Brookfield viscosity higher than about 100 cps for a 50% solution at 25° C. Water may be added at the end of the polymerization to make an aqueous polymer solution.

Generally, a sufficient amount of organic acid derivative to react with substantially all of the primary amino groups but insufficient to react to any significant degree with the secondary amino groups of the polyalkylene polyamine is used. In an embodiment, the organic dicarboxylic acid derivative and polyalkylene polyamine are reacted in a molar ratio of about 0.8:1 to about 1.4:1. In another embodiment, the organic dicarboxylic acid derivative and the polyalkylene polyamine are reacted in a molar ratio of about 0.9:1 to about 1.0:0.9.

"Organic dicarboxylic acid derivatives" includes aliphatic and aromatic dicarboxylic acids and their corresponding acid chlorides, anhydrides and esters, and mixtures thereof. Esters are preferably $C_1$-$C_3$ aliphatic esters. The organic dicarboxylic acid derivatives are selected such that the resulting polyamide is water soluble or water dispersible.

Representative organic dicarboxylic acids and their derivatives include maleic acid, succinic acid, glutaric acid, adipic acid, pimelic acid, suberic acid, azelaic acid, sebacic acid, phthalic acid, isophthalic acid, terephthalic acid, naphthalenedicarboxylic acid, dimethyl maleate, dimethyl malonate, diethyl malonate, dimethyl succinate, di-isopropyl succinate, dimethyl glutarate, diethyl glutarate, dimethyl adipate, methyl ethyl adipate, dimethyl sebacate, dimethyl phthalate, dimethyl isophthalate, dimethyl terephthalate, dimethyl naphthalenedicarboxylate, dibasic esters (DBE), poly(ethylene glycol) bis(carboxymethyl)ether, succinyl chloride, glutaryl dichloride, adipoyl chloride, sebacoyl chloride, sebacate, phthaloyl chloride, isophthaloyl chloride, terephthaloyl chloride, naphthalenedicarboxylate, maleic anhydride, succinic anhydride, glutaric anhydride, phthalic anhydride, 1,8-naphthalic anhydride, and the like.

"Polyalkylene polyamines" means those organic compounds having two primary amine (—$NH_2$) groups and at least one secondary amine group where the amino nitrogen atoms are linked together by alkylene groups, provided no two nitrogen atoms are attached to the same carbon atoms. Representative polyalkylene polyamines include diethylenetriamine (DETA), triethylenetetraamine (TETA), tetraethylenepentaamine (TEPA), dipropylenetriamine, and the like.

The polyaminoamide is then reacted with epichlorohydrin under controlled conditions to form the polyaminoamide-epichlorohydrin (PAE) resin. Preferably, the polyaminoamide is diluted with water to a concentration of about 10 to about 50 weight percent, and the solution is cooled below about 25° C. An amount of epichlorohydrin sufficient to react with the desired amount of the secondary amino groups in the polyaminoamide is then slowly added in the solution. The mixture is then heated at a temperature of about 40° C. to about 100° C. until desired viscosity is reached, typically about 2 to about 8 hours. The preparation of suitable polyaminoamide-epichlorohydrin resins is described in U.S. Pat. No. 6,277,242, incorporated herein by reference.

In an embodiment, the epihalohydrin is epichlorohydrin.

In an embodiment, the mole ratio of epichlorohydrin to secondary nitrogen atoms in the polyaminoamide is less than about 0.5.

In an embodiment, the polyaminoamide is the reaction product of diethylenetriamine and a dicarboxylic acid derivative selected from adipic acid, glutaric acid, DBE-2 dibasic ester, dimethyl glutarate and dimethyl adipate or a mixture thereof.

Glyoxylated polyacrylamide resins useful in the composition of this invention can be prepared by reacting a polymer comprising amido groups with one or more aldehydes at a pH between 4 to 12. The preparation of glyoxylated polyacrylamides is described, for example, in U.S. Patent Application Publication No. 2005/0161181.

Suitable aldehydes include any compound containing at least one aldehyde (<HO) functional group having sufficient reactivity to react with the amino or amido groups of the polymer. Representative aldehydes include formaldehyde, paraformaldehyde, glutaraldehyde, glyoxal, and the like. Glyoxal is preferred. The total concentration of polymer backbone plus aldehyde is between about 5 to about 35 weight percent. Generally, an aqueous solution of the polymer backbone is prepared for better reaction rate control and increased product stability. The reaction temperature is generally about 20 to about 80° C. preferably about 20 to about 40° C. An aqueous aldehyde solution is added to the aqueous polymer backbone solution with good mixing to prevent gel formation. After the addition of aldehyde the pH is adjusted to about 4 to about 12 to achieve the desired reaction rate. After the adjustment of the pH generally the amount of monoreacted amide is optimum for the given ratio of aldehyde to amide and the amount of direacted amide is low. The rate of viscosity increase is monitored during the reaction using a Brookfield viscometer. A viscosity increase of 0.5 cps indicates an increase in polymer molecular weight and an increase in the amount of direacted amide. The amount of monoreacted amide is generally maintained during the viscosity increase but the amount of direacted amide increases with viscosity. Generally, the desired viscosity increase corresponds to a desired level of monoreacted amide, direacted amide and molecular weight. The rate of reaction depends on the temperature, total concentration of polymer and aldehyde, the ratio of aldehyde to amide functional groups and pH. Higher rates of glyoxylation are expected when the temperature, total concentration of polymer and aldehyde, the ratio of aldehyde to amide functional groups or pH is increased. The rate of reaction can be slowed down by decreasing the total concentration of polymer and aldehyde, temperature, the ratio of aldehyde to amide functional groups or pH (to between about 2 to about 3.5). The amount of unreacted aldehyde at the end of the reaction increases as the ratio of aldehyde to amide functional groups is increased. However, the total amount of monoreacted and direacted amide becomes larger.

The stability of the glyoxylated polyacrylamide depends on the storage temperature, product viscosity, total amount of reacted amide/amine, total concentration of polymer and aldehyde, the ratio of aldehyde to amide/amine functional groups and pH. Generally, the pH of the product is maintained at a low pH (2 to 3.5) and the total concentration of polymer and aldehyde is optimized to extend shelf stability.

The reaction conditions are selected such that at least about 5 mole percent, preferably about 10 mole percent of the amido groups in the polymer react with the aldehyde to form the glyoxylated polyacrylamide.

In an embodiment, the glyoxylated polyacrylamide resins are selected from reaction products diallyldimethylammonium chloride-acrylamide copolymer and one or more aldehydes selected from formaldehyde, paraformaldehyde, glyoxal and glutaraldehyde.

The glyoxylated polyacrylamide may comprise about 50 to about 99 mole percent, preferably about 70 to about 99 mole percent acrylamide monomers and 1 to about 50, preferably 1 to about 30 mole percent N,N-diallyldimethylammonium chloride in which about 2 to about 50, preferably about 5 to about 15 mole percent of the amide groups of the copolymer have reacted with glyoxal.

Crosslinked polyaminoamide resins suitable for use in the composition of this invention can be prepared by reacting a polyaminoamide as described herein with a difunctional aldehyde of formula $HOC(CH_2)_xCHO$ where x is 0-6. Representative difunctional aldehydes include glutaraldehyde, glyoxal, and the like. The preparation of suitable crosslinked polyaminoamide resins is described in U.S. Pat. No. 5,382,323.

In a typical preparation, a solution of polyaminoamide is heated at a temperature of up to about 52° C. The polyaminoamide solution is then treated with the dialdehyde at a level of 0.1-1.1 moles/polymer repeat unit. Reaction between the polyaminoamide and dialdehyde is continued until the desired molecular weight is achieved, at which time the reaction mixture is diluted to 2-20% actives and acidified to pH of about 2.5 to about 5.0. The identity of the acid used to adjust the pH of the product is not critical. Representative acids include sulfuric acid, acetic acid, citric acid, phosphoric acid, hydrochloric acid, and the like.

In an embodiment, the crosslinked polyaminoamide resin is selected from reaction products of one or more aldehydes selected from glyoxal and glutaraldehyde and a polyaminoamide which is a copolymer of diethylenetriamine and one or more dicarboxylic acid derivatives selected from DBE-2 dibasic ester, adipic acid, glutaric acid, dimethyl glutarate and dimethyl adipate.

The resins which comprise the high and low molecular weight components of the composition of this invention are each independently selected from glyoxylated polyacrylamide, crosslinked polyaminoamide and polyaminoamide-epihalohydrin resins.

In some embodiments, the high and low molecular weight resins are selected from polyaminoamide epihalohydrin resins selected from reaction products of epichlorohydrin and a polyaminoamide which is a copolymer of diethylenetriamine and one or more dicarboxylic acid derivatives selected from DBE-2 dibasic ester, adipic acid, glutaric acid, dimethyl glutarate and dimethyl adipate.

In other embodiments, the low molecular weight resin is a crosslinked polyaminoamide resin are selected from reaction products of one or more aldehydes selected from glyoxal and glutaraldehyde and a polyaminoamide which is a copolymer of diethylenetriamine and one or more dicarboxylic acid derivatives selected from DBE-2 dibasic ester, adipic acid, glutaric acid, dimethyl glutarate and dimethyl adipate.

In other embodiments, the high and low molecular weight resins are selected from polyaminoamide epihalohydrin resins selected from reaction products of epichlorohydrin and a polyaminoamide which is a copolymer of diethylenetriamine and adipic acid.

In other embodiments, the high molecular weight resin is a glyoxylated polyacrylamide selected from reaction products diallyldimethylammonium chloride-acrylamide copolymer and one or more aldehydes selected from formaldehyde, paraformaldehyde, glyoxal and glutaraldehyde and the low molecular weight resins are selected from the group consisting of glyoxylated polyacrylamide, crosslinked polyaminoamide and polyaminoamide-epihalohydrin resins.

In other embodiments, the high molecular weight resin is a crosslinked polyaminoamide resin is selected from reaction products of one or more aldehydes selected from glyoxal and glutaraldehyde and a polyaminoamide which is a copolymer of diethylenetriamine and one or more dicarboxylic acid derivatives selected from DBE-2 dibasic ester, adipic acid, glutaric acid, dimethyl glutarate and dimethyl adipate.

The composition of this invention may be applied to the surface of a creping cylinder as a dilute aqueous solution. In an embodiment, the aqueous solution comprises about 0.01 to about 50 percent by weight of the high and low molecular weight resin mixture and about 99.99 to about 50 weight percent water. Those skilled in the art of creping adhesives will appreciate that the reason for such a larger percentage of water in the admixture is in part based on the need to only deposit a very thin layer of adhesive on the creping cylinder, which, in one embodiment, is most easily accomplished with a spray boom.

The pH of the aqueous solution may be adjusted in order to further stabilize the composition. In an embodiment, the pH is adjusted to about 2-7. In another embodiment, the pH is adjusted to about 4-6. The pH adjustment may be accomplished using any organic or inorganic acid. Representative acids include formic, acetic, sulfuric, hydrochloric, phosphoric, and the like. In an embodiment, the pH is adjusted using sulfuric or phosphoric acid or a mixture thereof.

In an embodiment, the adhesive composition of this invention further comprises one or more polyols, one or more phosphate salts or a mixture thereof.

As used herein, "polyols" refers to simple water-soluble polyols composed of alkylene groups and up to about six hydroxyl groups in which the alkylene groups are optionally interrupted by one or more O or NH groups. Representative polyols include glycerol, ethylene glycol, 1,4-butanediol, diethanolamine, triethanolamine, sorbitol, diethylene glycol, triethylene glycol, propylene glycol, dipropylene glycol, polyethylene glycol, and the like.

In an embodiment, the polyols are selected from glycerol, ethylene glycol, sorbitol, diethylene glycol, propylene glycol, polyethylene glycol and diethanolamine.

In an embodiment, the polyol is glycerol.

Representative phosphate salts include the sodium, potassium and ammonium salts of orthophosphate, pyrophosphate, metaphosphate, polyphosphate, phosphite and hypophosphite. Phosphate salts also include phosphate salts formed in-situ by adjustment of the pH of the creping composition with phosphoric acid. In an embodiment the phosphate salts are selected from monoammonium phosphate, diammonium phosphate, phosphate salts formed in situ by adjusting the pH of the creping composition with phosphoric acid, and mixtures thereof.

The amount of polyols and/or phosphate salts in relation to the resin composition on a dry polymer basis typically ranges from about 0.5 to about 100 percent by weight. In an embodiment it is desirable to use between about 0.5 to about 20 percent by weight of the polyols and/or phosphate salts. It is to be understood that not all of the polyols produce similar results. In certain instances, depending upon the temperature employed, the particular resin composition used and other variables, routine experimentation will be necessary to determine the optimum polyol or phosphate salts to be used, as well as the particular amount to be employed in conjunction with the particular resin composition.

In an embodiment a release aid that is also diluted, emulsified or dispersed to aqueous form is applied to the Yankee dryer along with the polymer adhesive. The release aid interacts with the adhesive materials on the Yankee dryer surface to avoid excessive coating build-up, to manage the sheet adhesion and to reduce doctor blade wear. Representative release aids include release oils composed of naphthenic, paraffinic, vegetable, mineral or synthetic oil and emulsifying surfactants. In order to form stable aqueous dispersions the release aid is typically formulated with one or more surfactants such as fatty acids, alkoxylated alcohols, alkoxylated fatty acids, and the like. The release aid may be applied to the creping cylinder before or after the adhesive composition, or may be formulated with the adhesive for application to the creping cylinder.

The adhesive compositions of this invention may also be used in combination with functional additives used in the art to improve the softness of the tissue or towel. Representative functional additives include organic quaternary salts having fatty chains of about 12 to about 22 carbon atoms including dialkyl imidazolinium quaternary salts, dialkyl diamidoamine quaternary salts, monoalkyl trimethylammonium quaternary salts, dialkyl dimethylammonium quaternary salts, trialkyl monomethylammonium quaternary salts, ethoxylated quaternary salts, dialkyl and trialkyl ester quaternary salts, and the like. Additional suitable functional additives include polysiloxanes, quaternary silicones, organoreactive polysiloxanes, amino-functional polydimethylsiloxanes, and the like. In an embodiment, the functional additives are selected from dialkylimidazolinium quaternary salts and quaternary silicones.

In an embodiment, the functional additives are formulated with the adhesive composition of this invention for application to the creping cylinder.

The spraying applications described above may be further improved by a variety of means, for example by using spraybooms designed for double or triple coverage, by oscillating the␣ spraybom and by recirculation of the diluted creping aid composition from the outlet of the sprayboom to improve mixing and reduce the possibility of separation. Targeted application of the resin composition may also be accomplished using the method and apparatus described in PCT 2004031475.

Alternatively, the composition, functional additives and/or release aid may be applied to the creping cylinder by use of air (or gas) atomization, rather than as aqueous solutions. The foregoing may be better understood by reference to the following examples, which are presented for purposes of illustration and are not intended to limit the scope of the invention.

EXAMPLE 1

Preparation of a Representative Adhesive Composition

To a 150-ml beaker is charged a 35 weight percent aqueous solution of a terpolymer of adipic acid, diethylenetriamine and epichlorohydrin having an epichlorohydrin to secondary amine molar ratio of about 0.04 and an average molecular weight of approx. 25,000 (17.97 g), a 15 weight percent aqueous solution of a terpolymer of glutaric acid, diethylenetriamine and epichlorohydrin having an epichlorohydrin to secondary amine molar ratio of about 0.20 and an average molecular weight of approx. 600,000 (22.73 g) and water (29.31 g). The mixture is mixed until homogeneous and the pH is adjusted to 5.0 with concentrated sulfuric acid.

EXAMPLE 2

Film Solubility

Representative adhesive compositions (1 mL) are adjusted to pH 7 and applied to pre-weighed 1"×2" strips cut from a paper towel. The strips are placed in a 105° C. oven for 1 hour and weighed to determine the mass of polymer in the strips. The strips are then placed in glass jars containing 150 mL of tap water that has been pre-heated to 50° C. in an incubator shaker. The jars with lids tightly sealed are shaken at 150 rpm and 50° C. for 1 hour. After this time, the strips are removed from the jar and placed in the 105° C. oven until dry. Once dry, the strips are is weighed again, and the amount of polymer that has dissolved is calculated. The results are shown in Table 1.

In the following Examples, PAE-I is a terpolymer of glutaric acid, diethylenetriamine and epichlorohydrin having an epichlorohydrin to secondary amine molar ratio of about 0.20 and an average molecular weight of about 600,000; PAE-II is a terpolymer of adipic acid, diethylenetriamine and epichlorohydrin having an epichlorohydrin to secondary amine molar ratio of about 0.90 and an average molecular weight of about 400,000, prepared as described in U.S. Pat. No. 6,277,242; and PAE-III is a terpolymer of adipic acid, diethylenetriamine and epichlorohydrin having an epichlorohydrin to secondary amine molar ratio of about 0.04 and an average molecular weight of about 25,000.

TABLE 1

| PAE-I/PAE-II or PAE-I/PAE-III ratio (based on polymer actives) | Film solubility (% polymer) | |
|---|---|---|
| | PAE-I + PAE-II (U.S. Pat. No. 6,277,242) | PAE-I + PAE-III (this invention) |
| 100/0 | 98.0 | 98.0 |
| 97.5/2.5 | 86.2 | |
| 95/5 | 68.3 | |
| 90/10 | 53.3 | |
| 75/25 | | 73.4 |
| 50/50 | | 55.8 |
| 25/75 | | 47.1 |

As shown in Table 1, the film solubility of the very soft adhesive film (completely water soluble) decreases with the addition of the PAE-III adhesive of this invention and for the prior art resin. A decrease in the film solubility indicates an improvement in the coating durability (improved resistance to water).

EXAMPLE 3

Peel-Force Adhesion

The adhesion provided by the formulations of this invention is measured by means of a peel adhesion test. This test measures the force required to peel a cotton strip from a heated metal plate. First an adhesive composition is applied to the metal panel by means of a #40 coating rod. The adhesive is applied to the panel at 15% actives. The metal plate is heated to 100° C. and at this point a wet (for wet tack) or dry (for dry tack) cotton strip is pressed into the film by means of a 1.9 kg cylindrical roller. After the strip is applied, the metal plate is placed in a 105° C. oven for 15 minutes to dry the strip. The metal plate is then clamped in a tensile testing apparatus. One end of the cotton cloth is clamped in the pneumatic grip of the tester and the cloth is peeled from the panel at an angle of 180° and at a constant speed. During the peeling the metal plate is controlled to a temperature of 100° C. The results are shown in Table 2.

TABLE 2

| PAE-I/PAE-II or PAE-I/PAE-III ratio (based on polymer actives) | Peel-force of blends (g/in) | |
|---|---|---|
| | PAE-I + PAB-II (U.S. Pat. No. 6,277,242) | PAE-I + PAB-III (this invention) |
| 100/0 | 238 | 211 |
| 97.5/2.5 | 410 | |
| 95/5 | 418 | |
| 90/10 | 33 | |
| 87.5/12.5 | | 327 |
| 75/25 | | 960 |
| 62.5/37.5 | | 685 |
| 50/50 | | 372 |
| 25/75 | | 154 |

The data shown in Table 2 demonstrates that the peel adhesion achieved with the blend of this invention at an optimal PAE-I/PAE-III ratio is much higher compared to the prior art blend. The best results are achieved with a blend of a terpolymer of glutaric, diethylenetriamine and epichlorohydrin (PAE-I) and a terpolymer adipic acid, diethylenetriamine and epichlorohydrin (PAE-III) at a 25/75 ratio, based on polymer actives.

Changes can be made in the composition, operation, and arrangement of the method of the invention described herein without departing from the concept and scope of the invention as defined in the claims.

The invention claimed is:

1. A method of creping a paper web comprising a) applying to a rotating creping cylinder an adhesive composition comprising one or more high molecular weight resins and one or more low molecular weight resins the ratio of high to low molecular weight resins being between <90:10 and 1:99 based on polymer actives the high molecular weight resins characterized as having a molecular weight of 250,000 to about 5,000,000 Dalton the low molecular weight resins characterized as having a molecular weight of less than 100,000 Dalton; b) pressing the paper web against the creping cylinder to effect adhesion of the paper web to the creping cylinder; and c) dislodging the paper web from the creping cylinder with a doctor blade wherein both the high molecular weight and low molecular weight resins comprise an amide consisting of-glyoxylated polyacrylamide.

2. The method of claim 1 wherein the high molecular weight resins consists essentially of glyoxylated polyacrylamide, and the low molecular weight resins consists essentially of glyoxylated polyacrylamide and the ratio of high molecular weight resin to low molecular weight resin is between 87.5:12.5 and 62.5:37.5.

3. The method of claim 2 in which the glyoxylated polyacrylamide resins are selected from reaction products diallyldimethylammonium chloride-acrylamide copolymer and one or more aldehydes selected from formaldehyde, paraformaldehyde, glyoxal and glutaraldehyde.

4. The method of claim 1 in which the high molecular weight resins and the low molecular weight resins further comprise additional polyaminoamide epihalohydrin resins which are selected from reaction products of epichlorohydrin and a polyaminoamide which is a copolymer of diethylenetriamine and one or more dicarboxylic acid derivatives selected from DBE-2 dibasic ester, adipic acid, glutaric acid, dimethyl glutarate and dimethyl adipate.

5. The method of claim 1 wherein the high molecular weight resins are crosslinked.

6. The method of claim 1 wherein the high molecular weight resin has a molecular weight of about 300,000 Dalton to about 800,000 Dalton and the low molecular weight resin has a molecular weight of about 20,000 to about 50,000 Dalton.

7. The method of claim 1 in which the composition further comprises one or more phosphate salts.

8. The method of claim 1 wherein the low molecular weight resins are crosslinked.

* * * * *